United States Patent
Yamamoto

(10) Patent No.: US 10,840,834 B2
(45) Date of Patent: Nov. 17, 2020

(54) METHOD FOR DRIVING SENSORLESS MOTOR

(71) Applicant: HOKUTO CONTROL CO., Ltd., Nagano (JP)

(72) Inventor: Kiyoshi Yamamoto, Nagano (JP)

(73) Assignee: HOKUTO CONTROL CO., LTD., Nagano (JP)

(*) Notice: Subject to any disclaimer, the term of this patent is extended or adjusted under 35 U.S.C. 154(b) by 0 days.

(21) Appl. No.: 16/477,476

(22) PCT Filed: Dec. 22, 2017

(86) PCT No.: PCT/JP2017/046181
§ 371 (c)(1),
(2) Date: Jul. 11, 2019

(87) PCT Pub. No.: WO2018/146957
PCT Pub. Date: Aug. 16, 2018

(65) Prior Publication Data
US 2019/0372489 A1    Dec. 5, 2019

(30) Foreign Application Priority Data
Feb. 8, 2017    (JP) .................................. 2017-021145

(51) Int. Cl.
*H02P 6/182*    (2016.01)

(52) U.S. Cl.
CPC .................................. *H02P 6/182* (2013.01)

(58) Field of Classification Search
CPC .. H02P 6/182; H02P 6/14; H02P 6/085; H02P 6/15; H02P 27/08; H02P 25/03; H02P 6/21; H02P 7/29
See application file for complete search history.

(56) References Cited

U.S. PATENT DOCUMENTS

| 4,162,435 A | * | 7/1979 | Wright | .................... H02P 6/182 |
| | | | | 318/400.04 |
| 4,654,566 A | * | 3/1987 | Erdman | .................... H02P 6/08 |
| | | | | 318/400.01 |

(Continued)

FOREIGN PATENT DOCUMENTS

| JP | 2000184775 | 6/2000 |
| JP | 2004166500 | 6/2004 |

(Continued)

OTHER PUBLICATIONS

Supplementary European Search Report dated Oct. 23, 2019 in corresponding European Patent No. 17 89 5920.

*Primary Examiner* — Thai T Dinh
(74) *Attorney, Agent, or Firm* — Stephen J. Weyer, Esq.; Stites & Harbison, PLLC

(57) ABSTRACT

The present invention addresses the problem of proposing a method for driving a sensorless motor, wherein the method is different from a conventional rotor position estimation method according to a time axis and performs rotor position estimation according to an angle axis, thus making it possible for excitation switching to always be achieved at an optimal angle in response to a change in speed. According to the present invention, an MCU (5) starts excitation of a coil at an excitation section starting point, measures an induced voltage component generated in the coil by a certain period of energization, integrates the voltage component, and sets an excitation section ending position when the integral value reaches zero. In addition, the motor is continuously rotated by repeating the same integration operation by switching to an excitation pattern in the next excitation section.

8 Claims, 9 Drawing Sheets

(56) References Cited

U.S. PATENT DOCUMENTS

| | | | | |
|---|---|---|---|---|
| 5,023,527 A * | 6/1991 | Erdman | ............ | F23N 3/082 |
| | | | | 318/400.34 |
| 7,202,617 B2 * | 4/2007 | Wu | ............ | H02P 6/182 |
| | | | | 318/400.25 |
| 7,288,911 B2 * | 10/2007 | MacKay | ............ | H02P 6/182 |
| | | | | 318/400.21 |
| 7,301,298 B2 * | 11/2007 | Shao | ............ | H02P 6/182 |
| | | | | 318/400.35 |
| 7,592,761 B2 * | 9/2009 | MacKay | ............ | H02P 6/20 |
| | | | | 318/254.1 |
| 10,348,226 B2 * | 7/2019 | Park | ............ | H02P 6/182 |
| 2013/0033212 A1 | 2/2013 | Hong et al. | | |
| 2015/0188467 A1 * | 7/2015 | Gu | ............ | H02P 6/182 |
| | | | | 318/400.35 |

FOREIGN PATENT DOCUMENTS

| | | |
|---|---|---|
| JP | 2006034049 | 2/2006 |
| JP | 2006115599 | 4/2006 |
| JP | 2008141828 | 6/2008 |

* cited by examiner

METHOD FOR DRIVING SENSORLESS MOTOR

TECHNICAL FIELD

The present invention relates to a method for driving a sensor less motor, which is a three-phase sensorless brushless DC motor and driven by rectangular waves and in which a rotor position is detected according to a rotational angle thereof, not a time axis.

BACKGROUND ART

Three-phase synchronous motors each of which has a permanent magnetic field and no position sensor are mainly driven by sine waves or rectangular waves. In a sensorless vector control system which is a typical sine wave drive system, there are problems that a high-performance A/D converter and a PWM control system which are used for high level control, e.g., FOC (Field Oriented Control) are required and that calculation load of a CPU must be significantly large. On the other hand, in a sensorless 120°-energization system which is a typical rectangular wave drive system, control can be easily performed, and a cost is low, so this system has been popular and mainly applied to small-size motors.

In the sensorless 120°-energization system, an excitation switching position is detected by: setting non-energization periods of 60° in each of U-, V- and W-phases; detecting a zero cross point of induced voltage where the induced voltage crosses the ½ potential of the inter-phase voltage; and setting a delay time of 30° by using a timer. A phase difference of 30° exists between the zero-cross point of induced voltage and the excitation switching position, so switching excitation cannot be performed in that state.

FIG. 11 shows a timing chart of 120°-energization in a three-phase brushless DC motor as a typical example. In each of U-, V- and W-phases, a solid line indicates an energization waveform and a dotted line indicates a waveform of induced voltage, and the V-phase and the W-phase have phase differences of ±120° with respect to the U-phase. In a section 1, rectangular energization is performed from the U-phase to the V-phase; in a section 2, rectangular energization is performed from the U-phase to the W-phase; in a section 3, rectangular energization is performed from the V-phase to the W-phase; in a section 4, rectangular energization is performed from the V-phase to the U-phase; in a section 5, rectangular energization is performed from the W-phase to the U-phase; and in a section 6, rectangular energization is performed from the W-phase to the V-phase. There are two non-energization sections of 60° in each phase, and the zero-cross point of induced voltage occurs at a center of the non-energization section and has a phase difference of 30° with respect to an excitation switching point.

Solid lines HU-HW show output waveforms of hall elements, and excitation switching control is performed in conventional brushless DC motors having position sensors on the basis of the shown signals.

A three-phase brushless direct current (DC) motor is shown in FIG. 12 as an example of a sensorless motor having no position sensor. A rotor 2 is capable of rotating about a rotor shaft 1 and has a permanent magnet 3 having a pair of magnetic poles, i.e., S-pole and N-pole. A type of magnetic pole structure (e.g., IPM, SPM) and a number of magnetic poles may be optionally selected. In a stator 4, armature coils (coils) U, V and W are formed on pole teeth, which are arranged with a phase difference of 120°, and they are star-connected through a common point C. In a three-line type motor, only coil lines are extended outward from the motor; in a four-line type motor, a common line too is extended outward.

An example of a block diagram of a conventional three-phase sensorless drive unit is shown in FIG. 13. An MCU (Micro-Control Unit) 51 is a control circuit. The MCU 51 stores six energization patterns for the three-phase coils (U, V and W) and magnetic field position information for assigning excitation switching sections (i.e., sections 1-6) of 120°-energization corresponding to each of the energization patterns, and switching-controls a motor driving circuit according to a rotation command sent from a superordinate controller so as to optionally switch an excitation state. Further, the unit includes a timer for delaying excitation switching timing for 30°.

An inverter circuit 52 (INV: the motor driving circuit) amplifies control signals sent from the MCU 51, energizes the three-phase coils, and performs a switching action, which is excitation phase switching control or PWM control. Half-bridge type switching circuits, which can be optionally connected to an electric power line and an earth line, are provided for three phases, and pre-drive circuits for driving output elements (e.g., FET) are also included.

A comparator circuit (ZERO) 53 is constituted by three comparators, which compare common voltage COM with each of coil voltages U, V and W. The common voltage is generated by combining resistances of three phases. It is constituted by many discrete elements, not shown, e.g., hysteresis setting resistance, output level matching resistance, protection element, denoising element.

Output signals of the comparator circuit 53 are sent to the MCU 51 as position signals. The MCU 51 detects a zero-cross point from an edge of output signal of the comparator, delays 30° by the timer, and switches an excitation phase of the inverter circuit 52.

Note that, no induce voltage is generated in a stationary state, so open-loop ramp start is performed, so output of the comparator is firstly validated when rotational number is increased. To securely detect the magnetic field position, high induced voltage, which is at least five times as high as hysteresis voltage of the comparator, is required, and final rotation number of the ramp start must be large, e.g., several hundred rpm to 1 k rpm.

In the conventional sensorless 120°-energization system, the manner for estimating an excitation switching position, which is performed by the timer after detecting the zero-cross point, has a big problem described later. Induced voltage E is in proportion to an angular speed ω, and a cycle T is 1/ω, so "E×T=constant".

Timing of excitation switching which is performed by a conventional position detection manner is shown in FIG. 14 (note that, a waveform of induced voltage will be shown as an approximately straight line in the following explanation). Rotational speed from 0°-phase to 30°-phase is varied with respect to that from −30°-phase to 0°-phase. In the waveform, a point A (E1, T1) indicates increasing speed, a point B (E2, T2) indicate a constant speed and a point C (E3, T3) indicates reducing speed.

Induced voltage E of a 30°-section×time T=constant, so E1×T1=E2×T2=E3×T3, and products of ET is shown as a hyperbolic curve (dotted line) passing through the points A-C.

Therefore, the timing of excitation switching must be varied in response to change of a rotational speed, but time is constant, i.e., T2, in the conventional delay timer manner, so an error of excitation switching angle, with respect to increasing and reducing speed in the 30°-section, will occur. In case of the small error, only torque and a motor efficiency will be lowered; in case of the large error, a phase is excessively delayed, and deadlock will occur when accelerating speed, and a phase is excessively advanced, torque will be lowered and step-out will occur.

In the conventional manner, position information, i.e., rotor angle, is estimated according to a time axis, so it is impossible to follow speed variation, correct positions can be estimated only when performing at constant speed, and large errors of angle estimation will occur when increasing and reducing speed. Namely, estimating the rotor angle according to a time axis causes problems, e.g., lowering motor efficiency, reducing torque, vibration, step-out, increasing current, noise generation.

To solve the above described problems, various methods for driving motors have been proposed, step-out is prevented by: for example, stopping output of an energization control circuit when a step-out monitoring circuit detects predictive data of step-out; changing to a free-running state; and then restarting rotation (see Cited Document 1). Further, an electric power supplying to stator coils is restrained from a prescribed time before an energization direction switching point, at which an energization direction is switched, with delaying a prescribed electric angle from an induce voltage zero-cross point where an excitation current of the motor is switched. (see Cited Document 2).

CITATION LIST

Patent Literature

Patent Literature 1: Japanese Laid-open Patent Publication No. 2008-141828
Patent Literature 2: Japanese Laid-open Patent Publication No. 2000-184775

SUMMARY OF INVENTION

Technical Problem

In the conventional sensorless driving methods, the zero-cross point is selected, and excitation is switched by using timer, etc., so an excitation switching phase is advanced when a motor load is applied and the motor speed is reduced, so torque is reduced; and then if the load is released, the motor speed is increased and the excitation switching phase is delayed, so the torque is reduced. In many fields, e.g., cutting work, conveying system, minute load variations actually occur, and phase advance and phase delay are repeated, so a torque generation efficiency in the conventional sensorless drive method is extremely lowered during most of operation. Further, sensorless motors are not employed in some uses in each of which viscous load is extremely varied due to occurring of step-out, so they are mainly used in, for example, a spindle motor for a hard disk drive unit in which load variation is small.

Other driving methods other than those described in said Patent Literatures 1 and 2 have been proposed, but all of the methods employ a manner of adjusting an excitation switching timing by using a timer, etc., and the position information, i.e., rotor angle, is estimated according to a time axis, so the conventional methods cannot follow speed variations.

Solution to Problem

The present invention has been invented to solve the above described problems, and an object of the present is to provide a method for driving a three-phase permanent magnetic field-type DC brushless motor having no position sensor, wherein the method is different from a conventional rotor position estimation method according to a time axis and performs rotor position estimation according to an angle axis, thus making it possible for excitation switching to always be achieved at an optimal angle in response to a change in speed.

Therefore, the problems can be solved by detecting a rotor angle without using a time axis. Thus, the rotor angle is obtained by time-integrating angular speeds, i.e., induced voltage because the rotor position can be obtained by time-integrating rotor speeds. This position detecting manner is defined as an induced voltage time-integration manner. It will be explained later.

The method for driving a sensorless motor, which is a three-phase DC brushless motor having no position sensor, said sensorless motor comprises: a motor driving circuit including a three-phase bridge circuit for energizing any two of three-phase coils; a control circuit for controlling the motor driving circuit according to a rotation command sent from a superordinate controller; and a voltage measuring circuit for measuring voltage of the coils energized by the motor driving circuit, the voltage measuring circuit includes: a voltage divider circuit for matching coil voltage of each of the phase coils energized by the motor driving circuit within a measurable input range if necessary; an A/D converter for measuring the coil voltage of each of the phase coils inputted through the voltage divider circuit; and an integration counter for integrating an induced voltage component included in the measured coil voltage of each of the phase coils, and the control circuit continuously rotates the motor by repeating the steps of: detecting an excitation section starting position, by the integration counter, while a rotor is rotated at a rotation number enabling detecting induced voltage or more; starting to energize the phase, which is energized by the motor driving circuit, with switching a energization pattern of the energized phase to that corresponding to a present excitation section when the integration counter detects the excitation section starting position; resetting the integration counter immediately after the motor driving circuit starts the energization; measuring coil voltage at a certain period by the A/D converter; extracting an induced voltage component from the coil voltage measured by the A/D converter and integrating the induced voltage component by the integration counter; and ending the excitation section when the integral value reaches or exceeds zero after the integration counter starts the integration.

(Note: induced voltage is detected by any one of following manners based on: 1) a difference between electric potential of a neutral point and electric potential of a non-energization phase; 2) a difference between electric potential of the neutral point and common electric potential; and 3) a difference between the common electric potential and electric potential of the non-energization phase. Note that, the electric potential of the neutral point is a half of electric potential of the neutral point.)

By using the above described method for driving the sensorless motor, the method performs rotor position estimation according to an angle axis, without performing estimation according to a time axis, thus making it possible for excitation switching to always be achieved at an optimal angle in response to a change in speed, so that a motor efficiency can be highly improved. Further, output voltage can be increased by reducing torque ripples, a consumption current can be simultaneously reduced, and heat generation of the motor can be reduced. Especially, in a small-sized brushless DC motor having a hall sensor, influences of sensor errors and magnetization errors are large, but the sensorless driving method is not influenced by the errors, so an operation efficiency thereof is higher than that of the motor having a hall sensor.

Preferably, the control circuit further performs a step of compensating a phase error caused by a leading angel and a delay angle, in which in case of a leading phase where "final induced voltage Va of a previous excitation section<first induced voltage Vb of the present excitation section" when switching an excitation section, theoretical cross-point voltage of induced voltage Vc is obtained by "Va+(Vb−Va)/2", and a resetting period, during which an integral value is reset until a measured value of induced voltage reaches Vc or less, is set; in case of a delay phase where "Va>Vb" when switching an excitation section, any one manner of a first manner, in which integration begins from first measurement of Vb, a second manner, in which a threshold value Vd is obtained by "−(Va+Vb)/2" without performing integration, and an excitation section is switched when a measured value of induced voltage reaches or exceeds Vd, and a third manner, in which the threshold value is set as "Vd=−Vb" without performing integration, and an excitation section is switched when a measured value of induced voltage reaches or exceeds Vd, is selected and performed, and wherein said phase compensation is repeated every time an excitation section is switched.

By the method, the correction according to phase errors of lead angles and delay angles is repeated, so that excitation switching can be always performed at a desired position which is near a cross-point of induced voltage and at which a minute lead angle is set. By accurately correcting the phase errors, torque ripples can be reduced, and torque can be increased, so that an effect like performing speed control can be obtained.

Preferably, in case of a leading phase when switching an excitation section, the control circuit obtains neutral point potential offset voltage by "(Vb-Vc)/(a measured frequency of the resetting period)" and adds it to neutral point potential when ending the resetting period.

By the method, an offset error of electric potential of the neutral point in each of the excitation sections, which is caused when a leading phase occurs, can be corrected.

Preferably, the control circuits stores an integration peak value of induced voltage component of the previous excitation section, calculates an average of the previous integration peak value and a present integration peak value so as to obtain a section angular moving average when detecting the integration peak value of induced voltage component of the present excitation section, sets the obtained integral value as a threshold value for determining an end of excitation section, switches an excitation section on the basis of the threshold value, and repeats to obtain a section angular moving average of two sections and corrects the threshold value with advancing excitation sections.

By the method, a phase angle of the excitation section end-side is corrected to obtain an average angle of the present and previous excitation sections, so that vibration and occurring a long period excitation section can be prevented.

In the method, the control circuit may perform lead angle control by delaying an integration starting position for a prescribed time or shifting an integration threshold value, which is a standard value for determining an end of an excitation section, by a prescribed value so as to forwardly shift a phase angle for switching excitation.

By the method, generating a spike current and noise can be reduced.

In the method, the control circuit may start the motor by direct current energization, with performing PWM control with duty ratio of 100% or linear drive in at least a first excitation section, when the rotor is started and positioned near a starting angle of an excitation section, then may measure induced voltage and may perform the integration In the driving method of the present invention, the position detection of the rotor does not depend on a rotational speed, so the method can be useful even if induced voltage is gradually or intermittently induced; further, the detected minute induced voltages are integrated and made a large integral value, so that the rotor position can be stably detected.

In the method, the control circuit may measure non-energization phase voltage for each measuring period and make a present measured value zero or not perform the integration of induced voltage component when a present measured value is equal to a previous measurement value.

By the method, a position detection error caused by a minute error caused in a stationary state of the motor can be avoided.

Preferably, the control circuit previously sets a prescribed prohibition period for an optional excitation section, during which determination of an end of the section is prohibited or during which determination of a section end is prohibited in case that the section end is detected in an abnormally short time when switching an excitation section after starting the rotation of the rotor, sets a measurement prohibition period, which is about an electric time constant τ Θ, immediately after energization of an excitation section, then measures non-energization phase voltage for each measuring period and integrates them, and performs the integration only, without determining an end of excitation section, until elapsing the prohibition period during which determination of a section end is prohibited.

By the method, if it is not the value more than the integral value, the integral value never exceeds a threshold value, so that erroneous determination caused by a large signal or noise can be prevented. The suitable prohibition period may be previously set on the basis of starting conditions, etc. and may be changed according to the rotation speed.

In the method, the control circuit may detect an initial position in case that an end of excitation section is not detected until elapsing a stop determination period, which has been previously set, after beginning energization of the excitation section, may excite a relevant excitation section in case that the rotor exists in any of the present excitation section, the previous excitation section and a next excitation section, and may perform a first manner for restarting the motor or a second manner, in which self-excitation positioning is performed in a present excitation pattern, without detecting the initial position, so as to restart the motor, in case that the rotor exists in other excitation sections.

By the first manner, even if the motor is brought into a deadlock state or a reverse rotation state, which is occurred by noise, an unexpected external force, erroneous position estimation, etc., the motor can be returned to a normal rotation state; and, by the second manner, probability of reverse rotation can be restrained, the rotor can be compulsorily stopped at a prescribed position, and the motor can be started by excitation corresponding to said position.

Advantageous Effects of Invention

By employing the above described method for driving the sensorless motor, the excitation switching can be always performed, at an optimum angle in response to a change in speed, by detecting the rotor angle without depending on a time axis, so that a motor efficiency can be highly improved. Further, the output voltage can be increased by reducing torque ripples, a consumption current can be simultaneously reduced, and heat generation of the motor can be reduced. Especially, in a small-sized brushless DC motor having a hall sensor, influences of sensor errors and magnetization errors are large, but the sensorless driving method is not influenced, so an operation efficiency is higher than that of the motor having a hall sensor.

Further, precise lead angle control can be performed when increasing and reducing speed, spike pulses occurring when the excitation switching is performed are reduced and high frequency waves are restrained, so that rotation noise, which is generated especially in a load operation, can be highly reduced. The lead angle control is capable of effectively generating reluctance torque and is capable of not only improving the motor efficiency but also increasing torque and reducing a consumption current. Further, a field-oriented control, in which the position can be detected while increasing and reducing speed without depending on the speed, is performed, a time of increasing speed can be shortened, the motor can be started in a short time, and deadlock and step-out can be prevented.

Further, a calculation time for position detection can be short, and a measuring period of induced voltage can be shortened, so a high-speed rotation, whose rotational speed is several times as fast as that of PWM-driven rotation, can be realized in case of performing linear drive.

Since the method does not depend on motor properties and a load current and is capable of operating without selecting a type of motor and operation conditions, so it can be applied to wide uses. Further, the method can be easily used because setting parameters and adjustment are not required.

A zero-cross comparator, a hysteresis setting circuit, a common generating circuit, etc. are not required, the circuits can be simpler, an interface part can be constituted by only six dividing resistances, no active parts are required, so that the method can easily applied to a high voltage system, and troubles can be reduced.

Control programs can be simpler, a developing time of software can be shortened, a high-performance CPU is not required due to small calculation load, and cost for both of hardware and software relating to the driving circuit can be reduced.

A high-performance system, which basically has high noise resistance, can be constituted, and a starting performance can be improved so that the motor can be securely started. Therefore, secure operation under noise environment, stall operation, a reciprocating motion including butting and stopping actions, all of which cannot be performed by the conventional sensorless driving manner, can be performed.

DESCRIPTION OF EMBODIMENTS

Embodiments of the method of the present invention for detecting a rotor position of a sensorless motor will now be described with reference to the attached drawings. The present invention can be widely applied to a sensorless driving method for sensorless-driving a sensorless motor comprising: a rotor 2 having a permanent magnetic field 3; and a stator 4 having star-connected coils, which are arranged with a phase difference of 120° and in which phase ends are connected to a motor driving circuit (see FIG. 12).

A method for sensorless-driving a three-phase DC brushless motor will be explained, as an example, with reference to the structure thereof.

Figure 12:
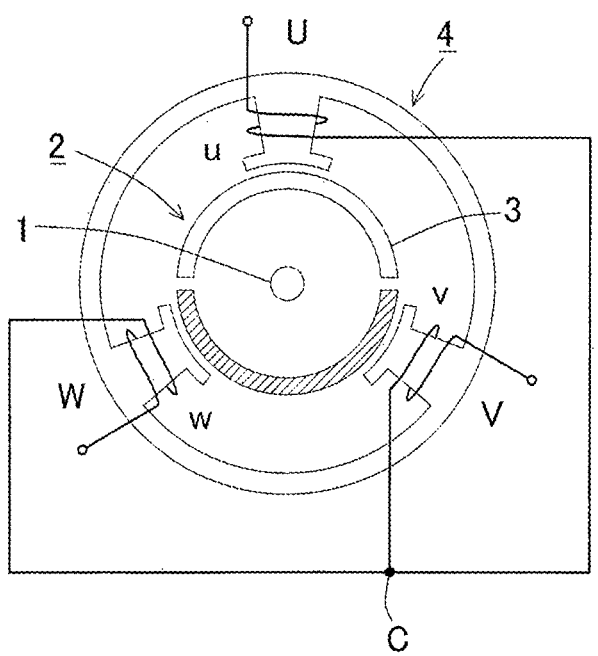
FIG. 12 is an explanation view of the three-phase sensorless motor.

An example of the three-phase DC brushless motor relating to the present invention is shown in FIG. 12. The three-phase brushless DC motor has a two-pole permanent magnet rotor and a stator 4 having three slots. The motor may be an inner rotor type or an outer rotor type.

In FIG. 12, the rotor 2 is integrated with a rotor shaft 1, and a two-pole permanent magnet 3 is provided as a magnetic field. The stator 4 facing the permanent magnet 3 has pole teeth U, V and W, which are arranged with a phase difference of 120°. Coils u, v and w are respectively formed on the pole teeth U, V and W, the phases are connected at common C, and they are connected to the motor driving system, which will be described later, as the three-phase brushless DC motor. Note that, a common line is not required, so it is omitted in the drawing.

Next, an example of a motor driving unit, to which the sensorless driving method can be applied, will be explained with reference to a block diagram of FIG. 10. An excitation manner is "one-phase 120°-bipolar rectangular wave energization manner" or the like. An MCU 5 (Micro-Control Unit: control circuit) includes: a CPU core; memories for storing various programs (e.g., ROM, flash memory); at least one timer (e.g., settable one and a watch dog timer); and an I/O section for communicating with peripheral units. The MCU 5 controls output signals, which are outputted from output terminals OUT 1-OUT 6 and sent to an inverter circuit 7 (INV: a motor driving circuit), according to rotation commands (RUN) sent from a superordinate controller 6. Further, the MCU 5 sends rotor position information and rotational direction information to the superordinate controller 6.

To control motor torque, the inverter circuit 7 usually switches an excitation phase or performs switching actions, e.g., PWM control. The inverter circuit 7 includes diodes, which are respectively connected in reversely parallel to switching elements, and half-bridge type switching circuits for each phase, which are capable of being optionally connected to a positive pole power source line and an earth power source line (a three-phase bridge circuit). The MCU 5 controls the inverter circuit 7 so as to energize any two of the three phase coils according to the rotation commands sent from the superordinate controller 6.

A voltage measuring circuit 8 measures voltages of the coils energized by the inverter circuit 7. The voltage measuring circuit 8 is connected to the MCU 5 through a voltage divider circuit 9 (RA), which matches voltage of each phase coil energized by the inverter circuit 7 within a measurable input range if necessary. The MCU 5 further includes: an A/D converter 10 (ADC) for measuring voltage of each phase coil inputted through the voltage divider circuit 9; and an integration counter 11 (CT) for integrating an induced voltage component included in the voltage of each phase coil.

Figure 13:
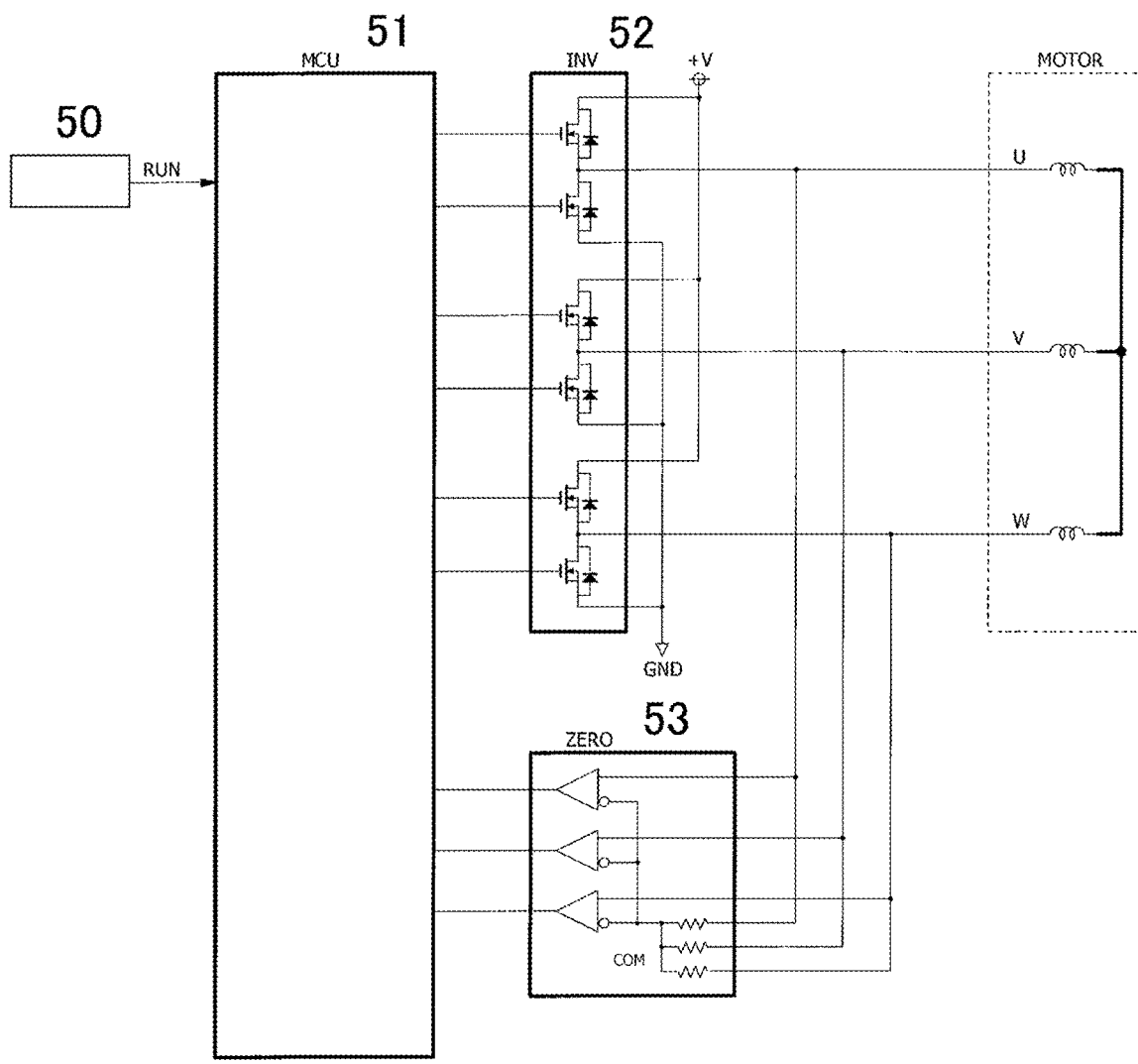
FIG. 13 is a block diagram of the conventional driving unit of the three-phase sensorless motor.
Figure 14:
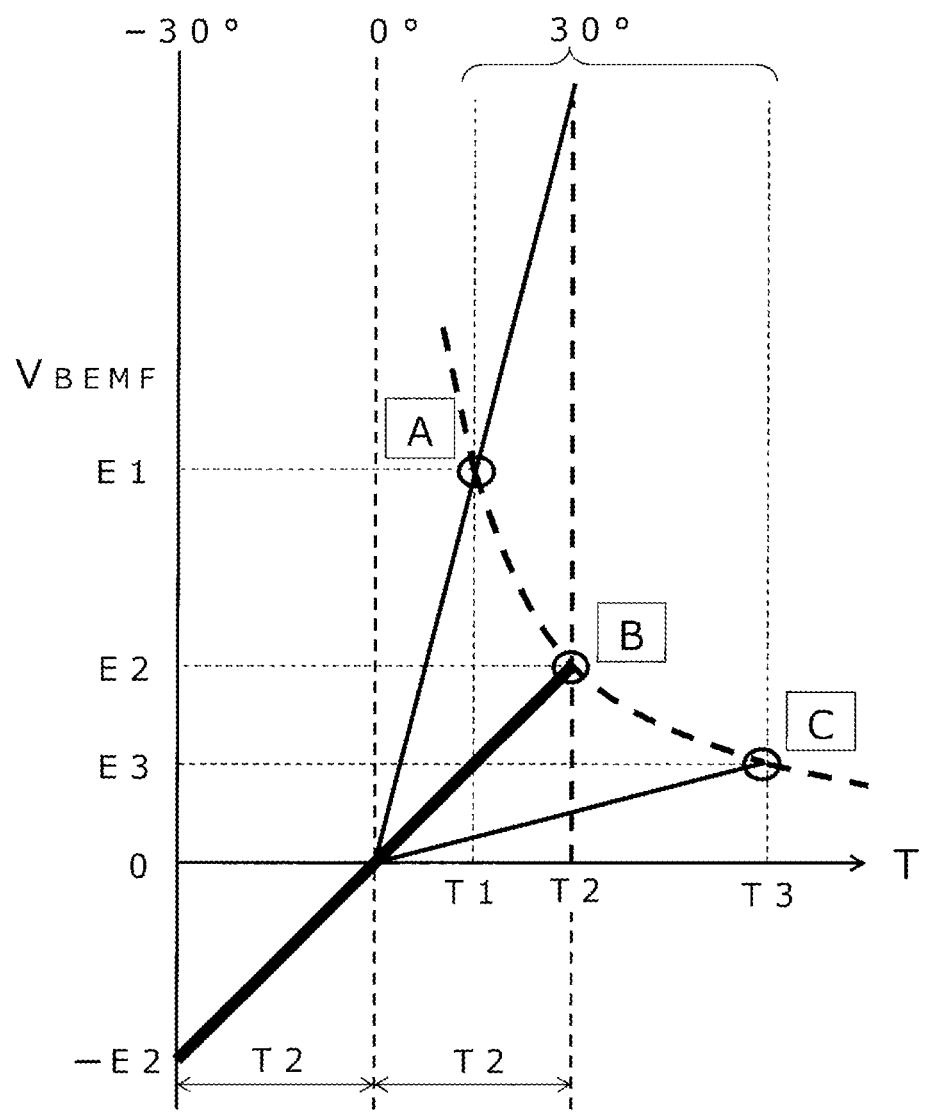
FIG. 14 is a timing chart of the excitation switching of the conventional sensorless driving method.

Unlike the block diagram of the conventional driving unit (see FIG. 13), the zero-cross comparator (ZERO) is omitted, but the coil voltages are adjusted (conditioning) within the input range by the divider circuit 9 and inputted them to the A/C converter 10 in the MCU 5 instead of the zero-cross comparator. Note that, no common voltage is used, so the motor may be a three-line type motor.

The divider circuit 9 (RA) is constituted by three sets of dividing resistances (r1, r2), (r3, r4) and (r5, r6), each of which is constituted by two resistances (e.g., r1 and r2) serially connected. One end of each dividing resistance is connected to the coil, and the other end thereof is connected to the earth. Output voltages are made small according to division rata (i.e., r2/(r1+r2), r4/(r3+r4), r6/(r5+r6)) and matched within the input range of the A/D converter 10. It can be applied to a high voltage driver circuit by increasing the partial voltage ratio. For example, in case that the partial voltage ratio is 1:99, a coil voltage becomes ¹⁄₁₀₀, so a voltage of 330V can be measured by a 3.3V-full range A/D converter.

The MCU 5 includes the three-channel A/D converter 10 so as to measure coil voltages. The integration counter 11 (CT) for integrating the coil voltages is also included. The A/D converter 10 measures voltage of each phase at a certain period, a standard sample holding circuit having one channel may be used, but a three-channel sample holding circuit capable of performing simultaneous sampling is preferable so as to eliminate measurement timing errors.

The sensorless driving controlled by the MCU 5 will be explained.

When the MCU 5 detects that the rotor 2 reaches an excitation section starting point while rotating at a rotation number enabling detecting induced voltage, and starts to energize the phase, which is energized by the inverter circuit 7, with switching a energization pattern of the energized phase to that corresponding to a present excitation section. A count value of the integration counter 11 is reset immediately after the inverter circuit 7 starts energization. The A/D converter 10 measures coil voltages at a certain measuring period. Induced voltage components are extracted from the coil voltages measured by the A/D converter 10 and integrated by the integration counter 11. If the integral value reaches or exceeds zero immediately after the integration counter 11 starts the integration, the excitation in the present excitation section is terminated. By repeating the above described steps, the motor can be continuously rotated.

(Induced Voltage Time-Integration Manner)

The above described manner for driving the sensorless motor is defines as an induced voltage time-integration manner, and this manner will be explained. By integrating an induced voltage E with a time T from a starting position of an excitation section, an induced voltage is changed at a center position, so the integral value reaches zero at an excitation section ending position. Therefore, an excitation section switching position can be known (hereinafter merely referred to as "60°-excitation section").

Figure 1:
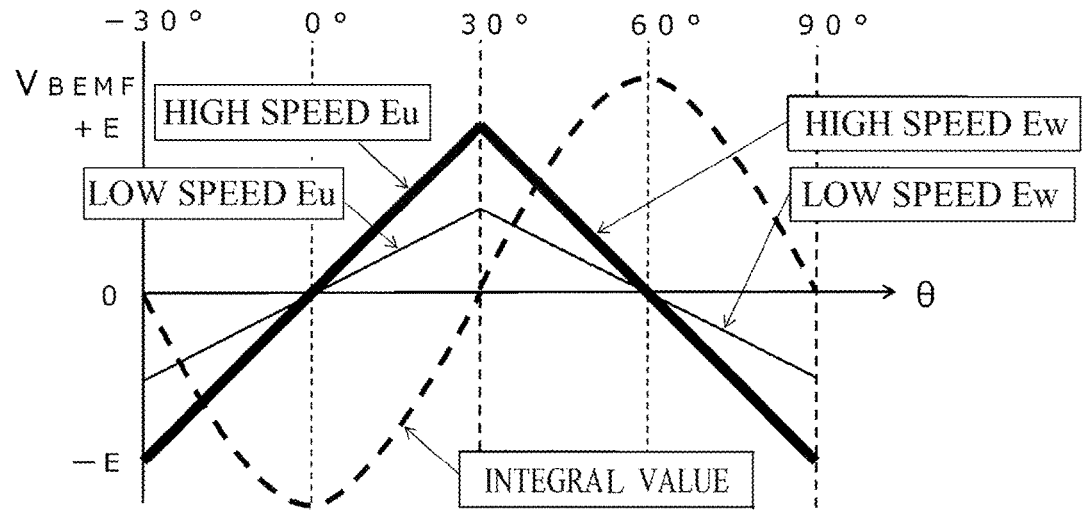
FIG. 1 is a waveform chart showing waveforms of induced voltages and a waveform of integral values.

FIG. 1 shows waveforms of induced voltage (solid lines) and a waveform of an integral value thereof (dotted line), with respect to an angle axis, while performing 120°-energization. A horizontal axis is an angle axis indicating a rotor angle θ, a vertical axis an indicates induced voltage and an integral value (i.e., ET integration), and the point 0 is neutral point potential. In FIG. 1, the waveforms indicate that the rotor 2 rotates at a constant speed, and shown waveforms relating to the following explanation are those at a constant rotational speed except some cases.

An object non-energization phase is switched for each section, the U-phase is firstly selected as the non-energization phase in FIG. 1, and induced voltage (high speed Eu; thick solid line) with respect to the 0 point is measured, then the phase is switched to the W-phase in the next section, and induced voltage (high speed Ew; thick solid line) is measured. For reference, induce voltage at low speeds (low speeds Eu and Ew; thin solid lines) are also shown.

The integral value is an integral value of induced voltages measured at a minute measuring period. According to the waveform of the integral value of Eu, the integral value starts from zero and takes a negative value and returns to zero at the excitation switching point. Similarly, the integral value of Ew starts from zero and takes a positive value and returns to zero at the excitation switching point. Namely, the integral value becomes zero at two points whose angles centered at a zero-cross point are equal, so the excitation switching point, i.e., section ending point, is the position at which the integral value integrated from the section starting point becomes zero again. This is a principle of the induced voltage time-integration manner for detecting the position of the rotor.

Figure 2:
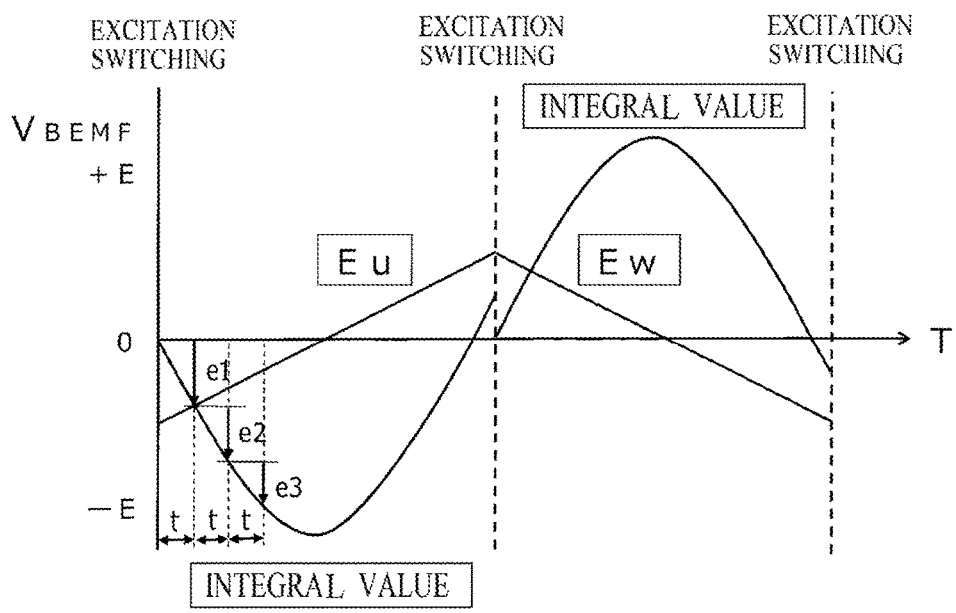
FIG. 2 is an explanation view of integration calculation.

The integration is performed by measuring induced voltages and integrating them at a certain minute period. FIG. 2 is an explanation view of the integration, and integral values of the measured values Eu and Ew at constant speed are shown with respect to a time axis. A vertical axis indicates an induced voltage and an integral value, a horizontal axis indicates time, and a measuring period t is, for example, a PWM carrier period. Waveforms of integral values show integral values which are obtained by integrating induced voltages el-en at the measuring period t and which form Riemann integration waveforms. Note that, the integral value will exceed zero due to quantization errors, so resetting the integral value is performed when switching the excitation section.

In the present invention, the excitation is started at the section starting point, induced voltages are measured and integrated at the certain period, and the section ending point is detected when the integral value becomes zero. Then, an energization pattern is changed to that for the next section, and the above described integration is repeated, so that the motor can be continuously rotated. By continuing the integration, errors are accumulated, but this problem can be solved by resetting the integral value zero when switching the excitation section. As described, the induced voltage time-integration manner is applied with being synchronized with the section starting point while rotating the motor at a rotation number enabling detecting the induced voltages. By treating only zero point of the integral value, the manner does not depend on the rotational speed, and adjusting time constant is not required.

Note that, an induced voltage can be extract from a difference between "non-energization phase voltage or common voltage and neutral point potential (½ of energization inter-phase voltage)", or a difference between "common voltage and non-energization phase voltage".

On the other hand, voltage applied to the coils is constant while performing PWM drive, but it varies while performing PAM drive or linear drive, so neutral point potential varies according to the driving manner. However, even if the neutral point potential varies, induced voltages are not varied. Therefore, in case that the non-energization phase voltage and voltages of the two energization phases are simultaneously measured, an average value is obtained as the neutral point potential by using the three-channel simultaneous sampling A/D converter, and induced voltages can be extracted without being influenced by variation of voltage applied to the coils. Further, the manner can correspond to variation of source voltage or variation of output voltage drop.

(Phase Compensation)

Phase compensation will be explained. The MCU 5 compensates a phase error caused by a leading angel and a delay angle: in case of a leading phase where "final induced voltage Va of a previous excitation section<first induced voltage Vb of the present excitation section" when switching an excitation section, theoretical cross-point voltage Vc of induced voltage is obtained by "Va+(Vb-Va)/2", and a resetting period, during which an integral value is reset until a measured value of induced voltage reaches Vc or less, is set; and in case of a delay phase where "Va>Vb" when switching an excitation section, any one manner of a first manner, in which integration begins from first measurement of Vb, a second manner, in which a threshold value Vd is obtained by "-(Va+Vb)/2" without performing integration, and an excitation section is switched when a measured value of induced voltage reaches or exceeds Vd, and a third manner, in which the threshold value is set as "Vd=-Vb" without performing integration, and an excitation section is switched when a measured value of induced voltage reaches or exceeds Vd, is selected and performed, and the above described phase compensation is repeated every time the excitation section is switched.

In the above described induced voltage time-integration manner, it does not converge to a certain section angle, so if an error occurs in the section angle, repeating vibration in a section of a long period and a short period will be generated and torque reduction will occur. The vibration can be prohibited by always performing the excitation switching at a desired position, so position errors must be corrected. Even if the correction is performed for each section, the errors can be limited within a practical range, so the correction may be performed only once when starting the section. Note that, in the present example, no comparison data of the first one section exist, so the correction is not performed for the first section.

An object is to perform the excitation switching at a cross-point of induce voltages of the adjacent sections, a state where the excitation switching is performed in an induce voltage cross-point phase is defined as a no error state, and a phase difference of the induced voltage occurring in a state where the excitation switching is performed at a position deviated from the induce voltage cross-point is defined as a phase error. The phase difference occurring in a state where the excitation switching is performed before reaching the induce voltage cross-point is defined as a lead angle error; the phase difference occurring in a state where the excitation switching is performed after reaching the induce voltage cross-point is defined as a delay angle error, and the both errors are respectively corrected by different correction manners in the present embodiment.

Figure 3:
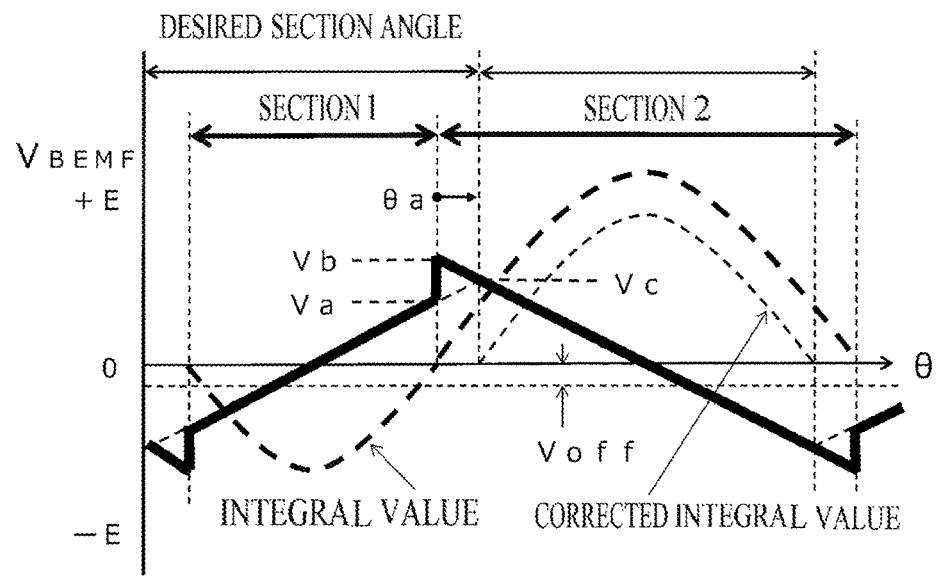
FIG. 3 is an explanation view of a lead angle error.

FIG. 3 explains the lead angle error. The drawing shows a waveform of induced voltage (solid line), a waveform of the integral value thereof (thin dotted line) and a waveform of a corrected integral value (thin dotted line). The sections, each of which is sectioned at the induced voltage cross-points in the no error state, are indicated as desired section angles.

A symbol $\theta a$ stands for a phase error (lead angle), a symbol Va stands for a final measured value of induced voltage in the section 1, a symbol Vb stands for a first measured value of induced voltage in the section 2, and a symbol Vc stands for voltage of theoretical induced voltage cross-point and is obtained by "Va+(Vb−Va)/2". A symbol Voff stands for offset of neutral point potential 0 (described later).

In FIG. 3, if no phase difference occurs when excitation is switched from the section 1 to the section 2 (the final induced voltage of the previous section 1 is equal to the first induced voltage Vb of the present section 2), it is determined that the excitation switching point is located at the induced voltage cross-point (Voltage Vc), so the correction is not needed.

In case of existing a phase error, the value Va sharply increases to Vb. In case that the induced voltage of the present section is higher than that of the previous section, the lead angle occurs, and a period occurring the phase error $\theta a$, from Vb to the voltage Vc of the induced voltage cross-point, is a phase error period when occurring the lead angle, so the integration is prohibited. To correct the lead angle error, a resetting period, during which the integral value is fixed to zero in the period occurring the phase error $\theta a$ or until the measured value of induced voltage exceeds the voltage Vc of the induced voltage cross-point and during which the integration is not performed, is set. The voltage Vc of the induced voltage cross-point is obtained by the following formula: Vc=Va+(Vb−Va)/2. Therefore, a phase of a section ending point advances to a phase of a forward induce voltage cross-point, so that the phase error of the lead angle can be corrected. Note that, a waveform of induced voltage and excitation switching points, which occur in a case that the phase error is not corrected, are also shown in FIG. 3.

Next, correcting a delay angle error will be explained.

Figure 4:
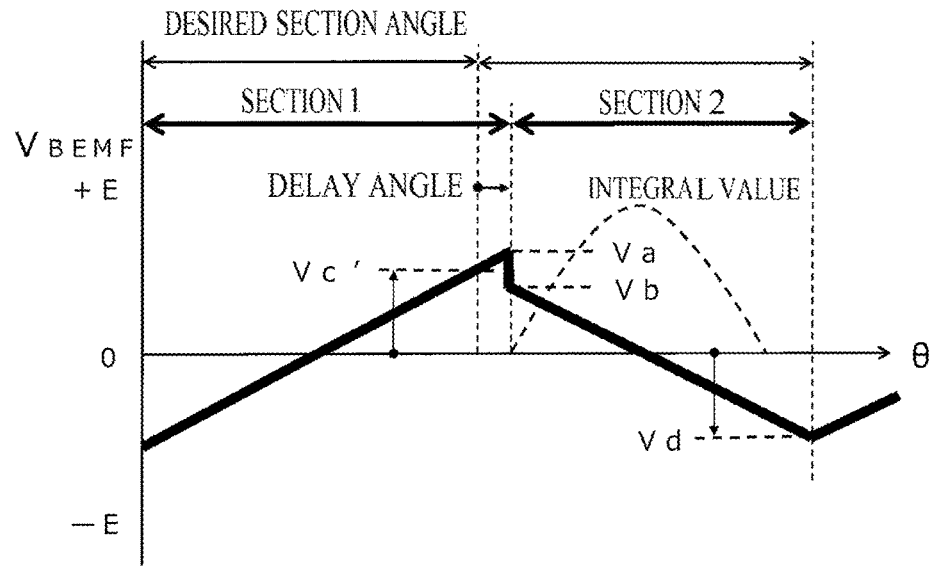
FIG. 4 is an explanation view of a delay angle error.

FIG. 4 explains the delay angle error. The same symbols assigned are used therein. A symbol Vc' stands for voltage of a previous induced voltage cross-point, and a symbol Vd stands for an induced voltage threshold value for determining an end of a section. As clearly shown in FIG. 4, in case of occurring the delay angle, the cross-point (Voltage Vc') of induced voltage cannot be detected because the position of the rotor has already passed through the induced voltage cross-point, so correcting phase error cannot be performed.

In the first manner for correcting the delay angle, the integration is started immediately after an excitation section is changed and the first Vb is measured. In this case, a section angle after the correction is small, so a lead angle occurs in the next section.

In the second manner for correcting the delay angle, an excitation switching phase is determined under the following hypothetical conditions: the rotational speed is constant during the delay angle section; and the voltage Vc' of the previous induced voltage cross-point and the voltage Vd of the next cross-point are equal. Namely, the integration is not performed when the delay angle occurs, and the excitation switching is performed on the basis of the voltage Vd, which is a threshold value and at which an induced voltage exceeds a standard voltage Vref by a value equal to the previous cross-point voltage Vc'. The threshold value is obtained by the following formula:

$$Vd=-Vc'=-(Va+Vb)/2$$

In FIG. 4, a waveform of the induced voltage on the end-side of the section 2 and the excitation switching point are corrected by the second manner, and an excitation switching angle is shown.

However, under the hypothetical condition of constant speed, if the rotational speed is varied lower, the section becomes too long. Thus, extension of the section can be prevented by making Vd small with considering speed reduction.

$$Vd=-Vc'\times(\text{reduction rate})$$

wherein reduction rate is one or less.

Therefore, the delay angle can be rapidly corrected and advanced.

In the third manner too, an excitation switching phase is determined under the following hypothetical condition: the rotational speed is constant during the delay angle section, i.e., $Vd=-Vb$.

Therefore, calculation can be simplified, and a delay angle can be rapidly corrected and advanced. In case of occurring the delay angle, only any one of the correction manners may be selected.

By repeating said correction manner corresponding to the phase error caused by the lead angle or the delay angle, the excitation switching can be always performed at a desired position which is near the cross-point of induced voltage and at which a minute lead angle is set.

By accurately correcting the phase error, torque ripples can be reduced, and torque can be increased, so that an effect like performing speed control can be obtained. Further, the coil current can be reduced.

(Correcting Offset Error)

Correcting an offset error will be explained. In case of occurring a leading phase when switching an excitation section, the MCU 5 obtains neutral point potential offset voltage by "(Vb−Vc)/(a measured frequency of the resetting period)" and adds it to neutral point potential when ending the resetting period.

A main reason of vibrating a period of an excitation section is offset of neutral point potential. The neutral point potential is a standard voltage for measuring induced voltage, and high accuracy value is required. In a three-line type motor having no common line, coil voltage of two energization phases, and "(energization inter-phase voltage)/2" must be set as the neutral point potential. However, the neutral point potential is varied by resistance deviation or variation of source voltage; if the neutral point potential is set as a constant value, offset errors will occur and will cause vibration.

Especially, in case that the neutral point potential is obtained from the energization inter-phase voltage only when starting the section by using a one-channel sampling A/D converter, offset becomes large. Therefore, offset must be sequentially corrected to obtain the correct neutral point potential while rotating.

Thus, a manner for adjusting offset when the neutral point potential is constant will be explained. An offset error Voff with respect to a neutral point potential Vref is shown in FIG. 3. Note that, Oa=the integration resetting period, Va=the final measured value of the previous section, and Vb=the first measured value of the present section.

An offset error of a lead angel phase is set on the basis of the following formula: "Voff=((Vb−Va)/2)/(measured frequency of the resetting period)". When lapsing the resetting period, the neutral point potential is set as follows: "Vref=Vref+Voff". Therefore, the offset error of the neutral point potential can be corrected.

(Phase Compensation by Section Angular Moving Average)

Phase compensation performed by using a section angular moving average will be explained. The control circuits stores an integration peak value of the previous excitation section, calculates an average of the previous integration peak value and a present integration peak value so as to obtain a section angular moving average when detecting the present integration peak value, sets the obtained value as a threshold value for determining an end of integration section, switches an excitation section on the basis of the threshold value so as to correct an end phase of integration section, and repeats to obtain the section angular moving average of two sections and corrects an end phase of integration section with advancing excitation sections.

In some cases, it is difficult to correct angle deviation between sections by performing determination for only one section. Thus, a moving average of the integration peak values of the two sections is obtained, and a section angle is corrected to the average. Inclination of the waveform of the integral value changes at a point corresponding to the integration peak value, so the integration peak value in the section can be obtained by comparing the current integration peak value with the prior integration peak value for each measuring period and storing the maximum value. The integration peak values become positive values and negative values according to the excitation sections.

Firstly, the MCU 5 stores an integration peak value as an integration peak value of the previous section at the ending position of the section. Next, an integration peak value is detected by comparing integral values, for each measuring period, in the present excitation section after switching the excitation section. Upon detecting the integration peak value, it is set as the integration peak value of the present section, an average of the stored integration peak value of the previous section and the integration peak value of the present section is obtained, then the obtained value is set as the integration threshold value for determining the end of the section. In a latter half of the section after a peak point, determining if the measured value exceeds the threshold value or not is started, then the section ending position is determined when the measured value exceeds the threshold value, and the excitation is switched. In the following sections, the section angles are corrected as well.

Note that, in the present embodiment, no previous integral value exists in the first excitation section, so the correction is not performed therein.

Figure 5:
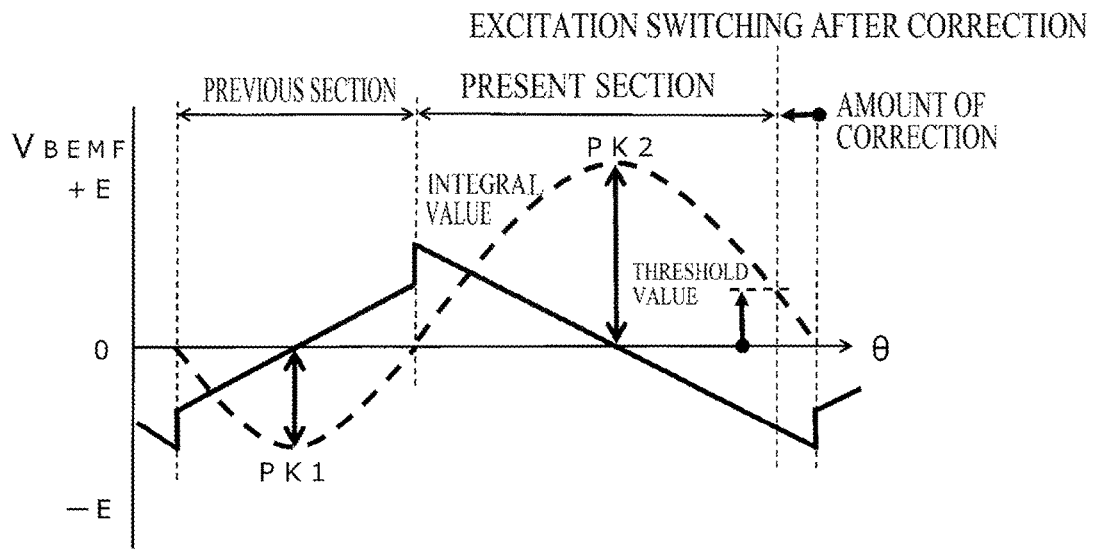
FIG. 5 is an explanation view of a section angular moving average.

FIG. 5 is an explanation view of the section angular moving average. A symbol PK1 stands for the integration peak value of the previous section, a symbol PK2 stands for the integration peak value of the present section, and the threshold value is "(PK1+PK2)/2". In the present embodiment, the section ending point is forwardly moved by an amount of the correction.

Therefore, an average angle between the previous and the present sections is set by correcting a phase angle of the section end position, so that occurring vibration and a long period section can be prevented.

(Lead Angle Control)

Lead angle control will be explained. The control circuit performs lead angle control by delaying the integration starting position for a prescribed time or shifting the integration threshold value, which is the standard value for determining the end of the excitation section, by a prescribed value so as to forwardly shift the phase angle for switching excitation.

The lead angle control means that the section starting position and the section ending position are forwardly phase-shifted, with respect to the normal positions, without changing a width of the section. A phase of a coil current is delayed with respect to that of a coil voltage, so the lead angle control, in which the excitation switching is performed at a phase angle earlier than that of the induced voltage cross-point, has been widely performed. Further, it is used to increase torque by taking advantage of reluctance torque. Generating spike current and noise can be reduced by the lead angle control.

A first manner of the lead angle control is delaying the integration starting position for an optional time (corresponding to the measured frequency). By this manner, a position exceeding zero on the section end-side is forwardly shifted for the optional time so as to delay the start of integration, and the excitation switching phase is advanced, so that the lead angle control is performed. An amount of leading angle may be set from 0° to about 30°, and the amount of leading angle may be changed for each section.

Figure 6:
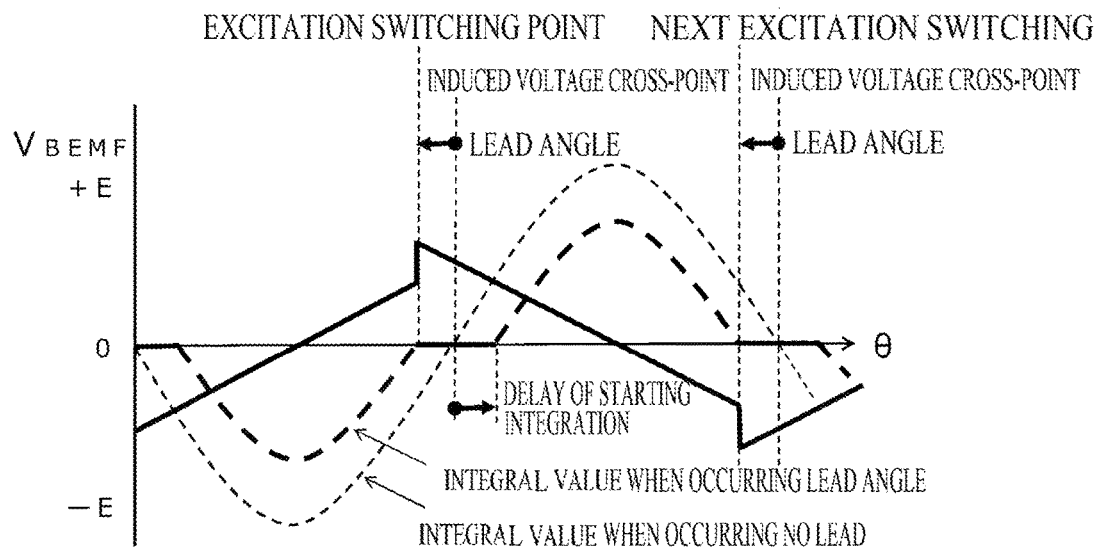
FIG. 6 is an explanation view of a lead angle caused by delay of starting integration.

FIG. 6 is an explanation view of the leading angle caused by delaying the start of integration. A waveform of induced voltage (solid line), a waveform of integral value under no lead angle control (thin dotted line) and a waveform of integral value under the lead angle control (dotted line) are shown in the drawing. The excitation switching is performed at a phase angle which is forwardly advanced, with respect to an induced voltage cross-point phase, by the angle of delaying the start of integration.

A second manner of the lead angle control, in which the threshold value for detecting the next excitation switching point from the integral value, will be explained. In case of setting no lead angle, the threshold value is zero. To set the lead angle on the basis of the threshold value, desired offset is set on the positive side when the integral value is a positive value; and desired offset is set on the negative side when the integral value is a negative value. By this manner, the phase of excitation switching is advanced forward.

Figure 7:
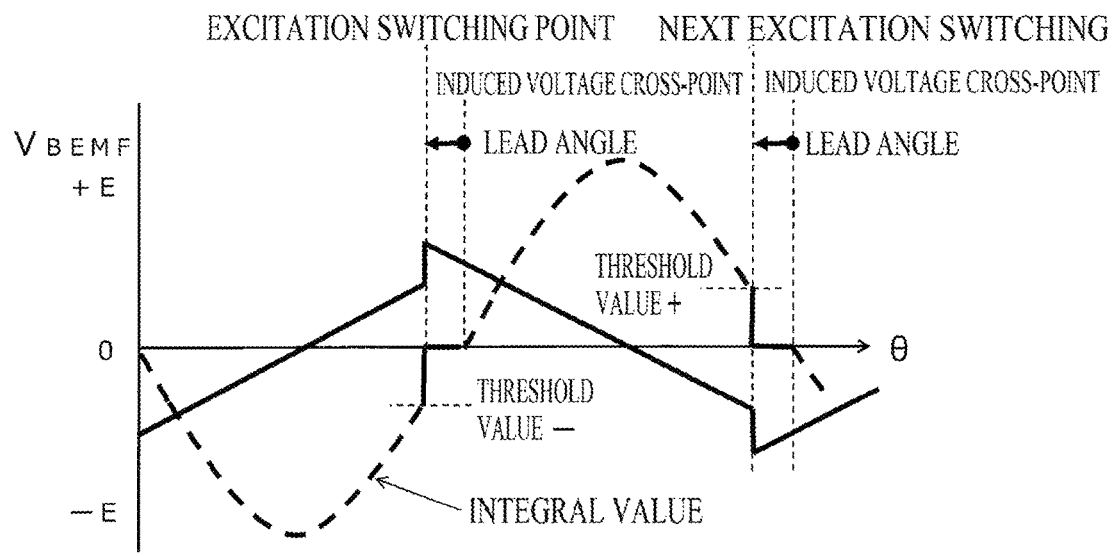
FIG. 7 is an explanation view of a lead angle caused by a threshold value.

FIG. 7 is an explanation view of setting the lead angle on the basis of the threshold value. A waveform of induced voltage (solid line) and a waveform of integral value under the lead angle control (dotted line) are shown in the drawing. At a threshold value+ and a threshold value –, the excitation switching is performed before reaching zero on the basis of the integral value for determining the section end, so the difference makes the lead angles.

(Starting Process)

A starting process of the motor will be explained.

The MCU 5 starts the motor by direct current energization, with performing PWM control with duty ratio of 100% or linear drive in at least a first excitation section, when the rotor is started and positioned near a starting angle of an excitation section, then measures induced voltages and performs the integration.

Figure 8:
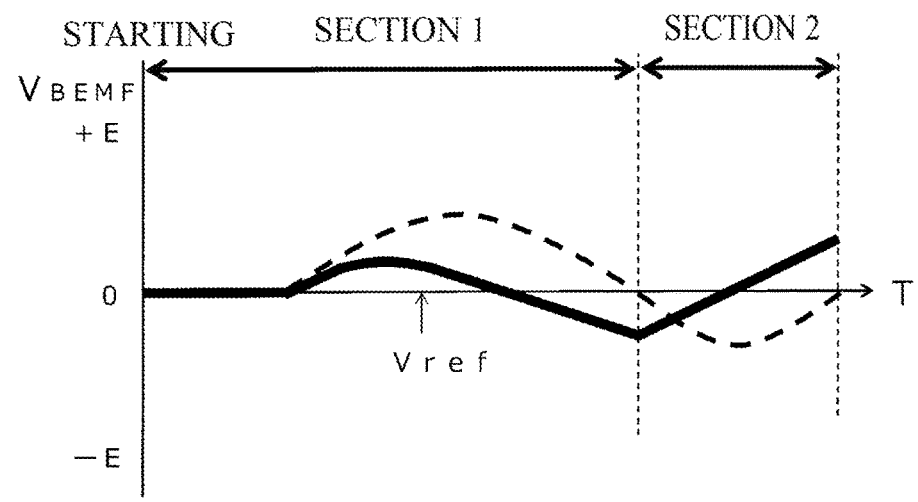
FIG. 8 is a waveform chart showing a waveform of induced voltage and a waveform of integral values when starting.

In the present invention, the section starting position is the integration starting position, so it is necessary, in a case that the method is applied from starting the motor, to detect the initial position of the rotor in a stationary state and apply the method after rotating the rotor 60° or less until reaching the section starting position of the next section. Various manners for detecting a rotor position in a stationary state and a state of extremely low speed have been proposed, so any of the manners is not assigned in the present embodiment. In FIG. 8, the initial position (the section 1) is detected, and the excitation is performed on the basis of the initial position so as to start the rotation. Then, the position detection is periodically performed to check if the position reaches near the starting position of the next section 2 or not. When reaching a position near the starting position of the next section 2, the control method is switched to the method of the present invention.

Figure 11:
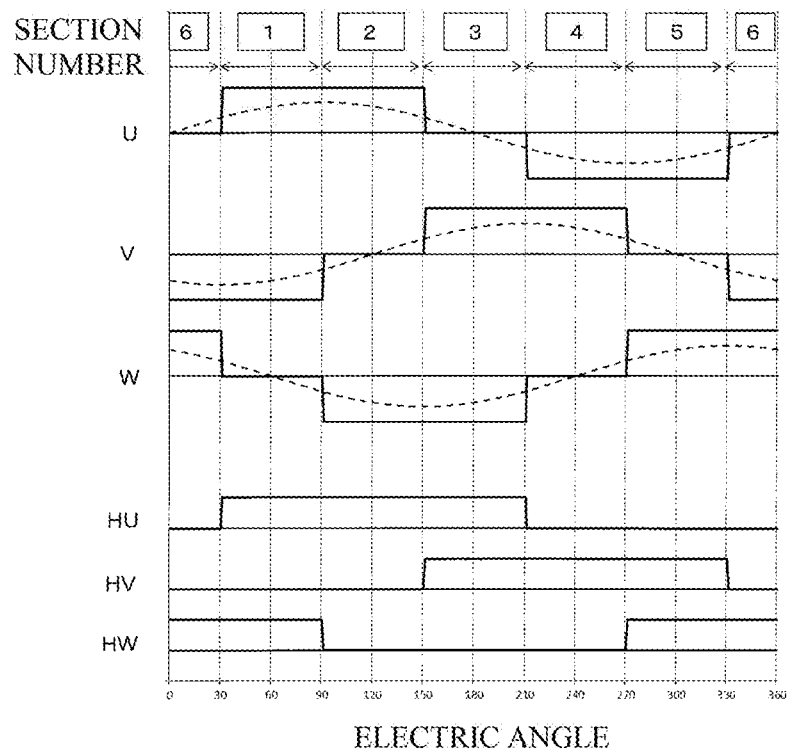
FIG. 11 is a timing chart of the 120°-energization manner.

Note that, positioning at the section starting position can be performed by a manner of self-excitation positioning. In this case, the starting can be performed by a simple process, in which detecting the initial position can be omitted. In the self-excitation positioning manner, an optional phase is energized by phase-locked energization so as to position the rotor 2 at a specific position. In FIG. 11, when energization is performed from the U-phase to the common, the rotor is rotated until a phase of 180°, and then torque becomes zero and the rotor stops there. When energization is performed from the common to the V-phase, the rotor stops at 120°. Therefore, when the U-phase is connected to the source+, the V-phase is connected to GND and the two-phase energization is performed, the rotor 2 is stopped by a resultant force of the U- and V-phases and remains stationary at a position of 150° with a holding power which is a half of peak torque. This phase angle is the starting position of the section 3. Similarly, by optionally selecting energization phases, the rotor 2 can be positioned at an optional section starting position, which starts from 30° and advances at 60°-step. This manner is the self-excitation positioning manner. In case that the initial position is unknown, the rotor is positioned at an optional section starting point, so, in some cases, the rotational angle for positioning becomes unstable, and reverse rotation occurs.

After positioning the rotor at the section starting point, the method of the present embodiment is applied to start the excitation, but the speed in the first excitation section is nearly zero and an induced voltage is scarcely generated. By performing the PWM drive in this state, high frequency PWM pulses are the same as measured coil inductance, so an excitation current reflects inductance in response to the rotor angle and varies, so non-energization phase voltage is changed on the basis of the following formula:

$$\Delta V = -\cos(2\theta)$$

wherein $\Delta V$ is change in voltage, and $\theta$ is the rotor angle.

In many cases, the $\Delta V$ is greater than an induced voltage, voltage relating to inductance variation is overlapped with the non-energization phase voltage during the pulse drive, so it is impossible to detect correct induced voltages.

Thus, the motor is started by direct current energization, with performing the PWM control with duty ratio of 100%, or linear drive in at least the first excitation section. With this energization, the inductance variation is not reflected to the non-energization phase voltage, so that minute induced voltage can be detected.

Figure 10:
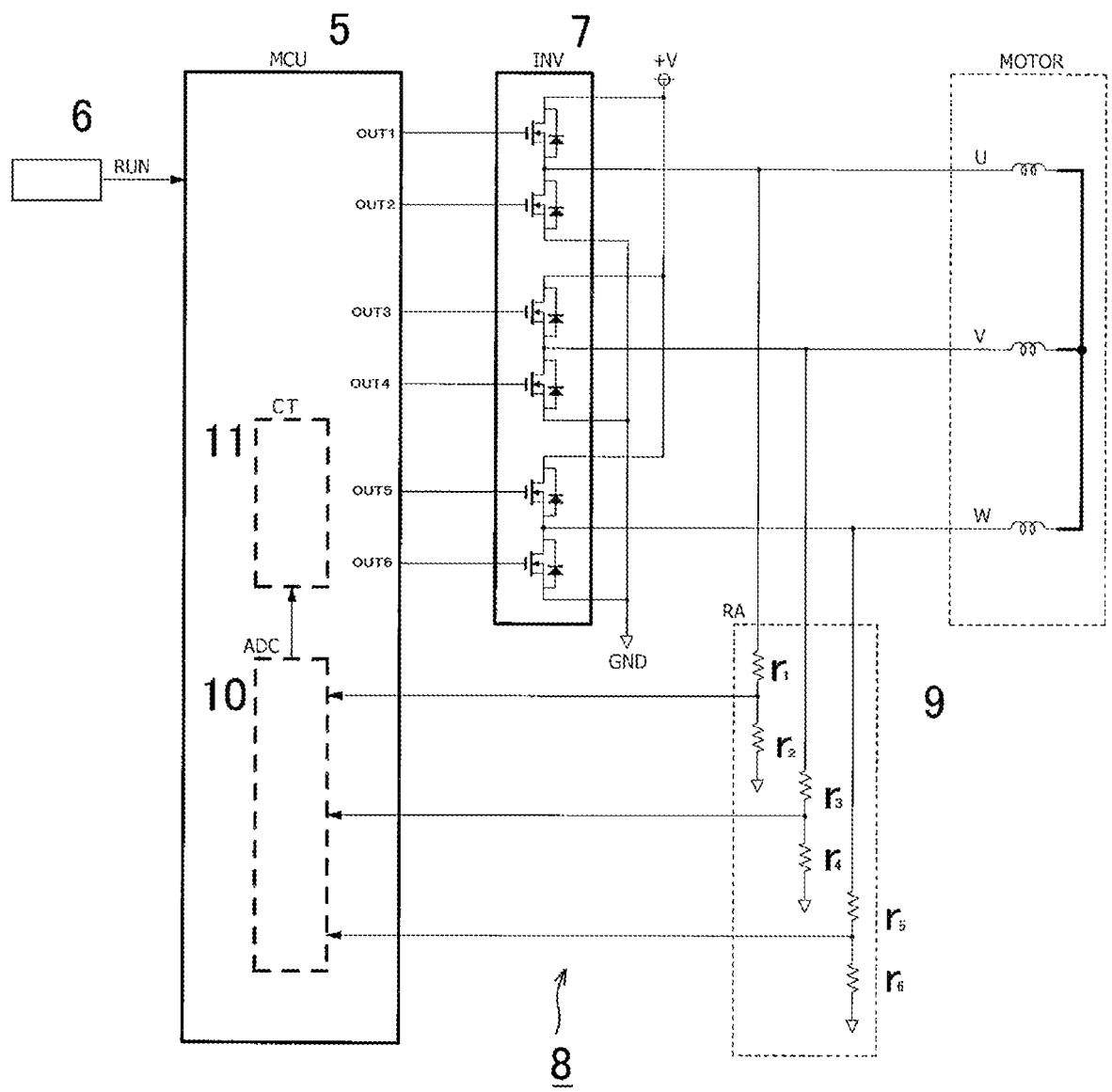
FIG. 10 is a block diagram of an example of a motor driving unit.

In this case, adjustment of a starting current or starting torque is performed by changing the source voltage V applied to the inverter circuit 7 without reference to the PWM drive and the linear drive (see FIG. 10).

FIG. 8 is a waveform chart showing a waveform (solid line) of induced voltages and a waveform (dotted line) of the integral values, with respect to a time axis, when starting.

A symbol Vref stands for neutral point potential. The induced voltage is zero when starting, and then the induced voltage is gradually generated. In the present embodiment, the method does not depend on speed, so that the induced voltage which is gradually increased or intermittently generated can be used. Further, the detected minute induced voltages are integrated to make a large integral value, so that the rotor position can be stably detected.

(Avoidance of Integration of Stationary Error)

Avoidance of integration of stationary errors will be explained.

The MCU 5 measures non-energization phase voltages at the measuring period, and it makes the present measured value zero or does not perform the integration when the present measured value and the previous measured value are equal, or an electric potential difference between the two is equal to a quantization error or less. To reduce the quantization error, the present measured value may be considered as "(previous measured value+present measured value)/2".

In case of applying the present invention from starting the motor and repeatedly measuring the non-energization phase voltage at the measuring period, an induced voltage of zero is measured every time when the speed is zero. In case of stopping the rotation from the rotating state too, the similar measurement occurs. However, an actual non-energization phase voltage is not complete zero, it has minute electric potential due to an offset error of the neutral point potential caused by coil resistance deviation and a quantization error. By repeatedly measuring the minute potential and integrating them, the errors are accumulated and become a large error which cannot be ignored.

To avoid the integration of the errors of the non-magnetization phase voltage in the stationary state, the control circuit makes the present measured value zero or does not perform the integration when the present measured value and the previous measured value are equal or when an error is equal to a quantization error or less. A section angular moving average of the measured values of the two sections may be obtained. Namely, the quantization error can be cancelled on the basis of the formula of: "present measured value=(previous measured value+present measured value)/2", and an integral value of the errors can be reduced. Therefore, position detection errors caused by the minute errors in the stationary state of the motor can be avoided.

Note that, the above described state, in which the present measured value is equal to the previous measured value, indicates that the rotor is stopped and in the stationary state. When normally starting the motor, the starting action is performed in several milliseconds, but if the rotor is held by an external force, it sometimes takes several seconds to start the motor. However, by performing the present countermeasure, restriction of a stationary time is released, so that stall operation, etc. can be performed.

(Noise Suppression)

Noise suppression will be explained. The MCU 5 previously sets a prescribed prohibition period for an optional excitation section, during which determination of an end of the section is prohibited or during which determination of a section end is prohibited in case that the section end is detected in an abnormally short time when switching an excitation section after starting the rotation of the rotor, sets a measurement prohibition period, which is about an electric time constant τ Θ, immediately after energization of an excitation section, then measures non-energization phase voltage for each measuring period and integrates them, and performs the integration only, without determining an end of excitation section, until elapsing the prohibition period during which determination of a section end is prohibited.

Immediately after starting the energization for switching an excitation section, the voltage is often unstable and the error of neutral point voltage is often large due to spike noise, etc. Further, circuit random noise and electric source noise are always generated, and the induced voltage will be minutely varied by rotor vibration, a stick slip phenomenon.

On the other hand, especially when starting the motor, a low speed rotation range can be advantageously extended and a starting performance can be improved by detecting minute induced voltage signals as much as possible, but it is improper to employ a lowpass filter so as to remove noise because the signals too will be removed by the filter.

Voltage level and frequency of noise highly depend on generation states, noise cannot be removed by one manner, so noise suppression is executed according to each noise generation state.

Firstly, the induced voltage is not measured within an unstable period, which is immediately after the energization and in which spike pulses of about the electric time constant τ θ are generated.

Then, the non-energization phase voltages are directly integrated without passing through the lowpass filter. Noise components are usually positive and negative symmetrically appeared, so the noises cancel each other by performing the integration without processing the noises; on the other hand, the induced voltage is unevenly generated and shifted to the positive-side or the negative-side, so it can be effectively integrated without being cancelled. Therefore, noise cancellation with large S/N ratio can be performed without phase delay.

Further, in the beginning of the integration, if the value equal to or less than the threshold value for determining the section end is generated for a moment, the section end will be erroneously detected, and the excitation switching is performed in a very short time, so the beginning period is a period sensitive to noise. Thus, the prohibition period, during which the integration is performed until the integral value becomes sufficiently large and the determination of the section end is prohibited, is set. By this manner, only when signals are equal to the integral value or larger, the integral value intersects a level for determining the section end, so that erroneous determination caused by large error signals or noise can be prevented. An optional period may be previously set as the determination prohibition period, and it may be changed according to the rotational speed. For example, the period of the section 1 is a fixed value (e.g., 1 millisecond), that of the section 2 is 25% of the previous section, and no period is set for the section 3 and further sections. By setting the period, occurring abnormally short sections can be prevented, and a minimum section width can be secured.

Further, when detecting the section end in an abnormally short time while rotation, a certain determination prohibition period may be set so as to secure the minimum section time width. For example, 50% of the section time of the previous section is set as the determination prohibition period. By setting the period, an abnormal state, in which, for example, the section is advanced one for a moment and a lead angle becomes about 60°, can be avoided, and the section time of at least about 30° can be secured, so that the rotation can be returned to a normal rotation.

By employing the countermeasures, noise can be strongly removed with detecting the minute induced voltages, so that the excitation switching can be performed at the correct positions.

(Countermeasures for Rotation at Extremely Low Speed and Position Estimation Error)

Countermeasures for rotation at extremely low speed and position estimation errors will be explained. In case that the section end is not detected after starting the energization in the section and elapsing a stop determination period previously set, the MCU 5 detects the initial position again, performs the excitation in the present section when the rotor exists in the present section, the previous section or the next section, and performs a first manner, in which the motor is restarted, or a second manner, in which the self-excitation positioning is performed, by the present excitation pattern, to restart without detecting the initial position when the rotor exists in other sections.

In the present embodiment, if the rotor is rotated at an extremely low speed and an induced voltage is smaller than detection resolution, the rotation cannot be detected. If rotation at the extremely low speed, which is caused by an external force, etc., is continued, the section is advanced to the next one, but the circuit cannot be detected the advancement, then the rotation is stopped by holding torque, which is a half of the maximum torque, when reaching a self-excitation stopping position and becomes the deadlock state. If the rotor is compulsorily rotated by an external force, reverse rotation torque is generated and makes the rotor return to the deadlock position. These actions are unfavorable for the motor control, so constant torque should be generated in a constant direction.

Thus, after starting the energization in the present excitation section, if the excitation section ending point is not detected even when elapsing the stop determination period which has been previously set, the first manner is performed by detecting the initial position as well as starting the motor so as to confirm the rotor position. The measurement of induced voltages and the integration are not performed.

As a result, if the rotor exists in the present section, the present excitation, the measurement of induced voltages and the integration are continued as they are. If the rotor forwardly advances to the next excitation section, the excitation pattern is switched to that for the next excitation section. If the rotor backwardly advances to the previous excitation section, the excitation pattern is switched to that for the previous excitation section. By these actions, the extremely low speed rotation can be detected, and the stall operation, in which normal rotation torque is generated, can be performed even if the rotor is stopped, rotated at the extremely low speed or reversely rotated.

If the rotor exists in the section other than said three sections, a position estimation error is determined, then the self-excitation positioning corresponding to the section is performed, on the basis of the redetected initial position, so as to restart, and the present manner is applied when detecting the section starting point of the next section. Note that, a time for detecting the section starting point of the next section is monitored using the stop determination period, and the step may be returned to the initial position detection when elapsing the detection time.

By the manner, the rotor can escape from the deadlock state and the reverse rotation state, which are caused by noise, unexpected external forces or position estimation errors, and can return to the normal rotation state.

The stop determination period may be optionally set on the basis of use conditions; in case that, for example, the initial position detection time is about 1 millisecond and the stop determination period is set about 100 milliseconds, the initial position detection is repeated at about 100 milliseconds. In this case, energization efficiency is about 99%, sufficient torque can be secured, and sensing sound caused by the position detection action is 10 Hz which is lower than an audible range.

In the second manner, if the initial position cannot be detected, the state is considered as the deadlock state when elapsing the stop determination period. It is thought that the deadlock state is occurred by the self-excitation positioning with the present excitation pattern. Therefore, the rotor may be restarted by performing the self-excitation positioning with the present excitation pattern. By this manner, a probability of reverse rotation is reduced, the rotor 2 is compulsorily stopped at a prescribed position, and it can be restarted by the excitation corresponding to that position.

To recover the errors, any one of the manners may be performed.

Figure 9:
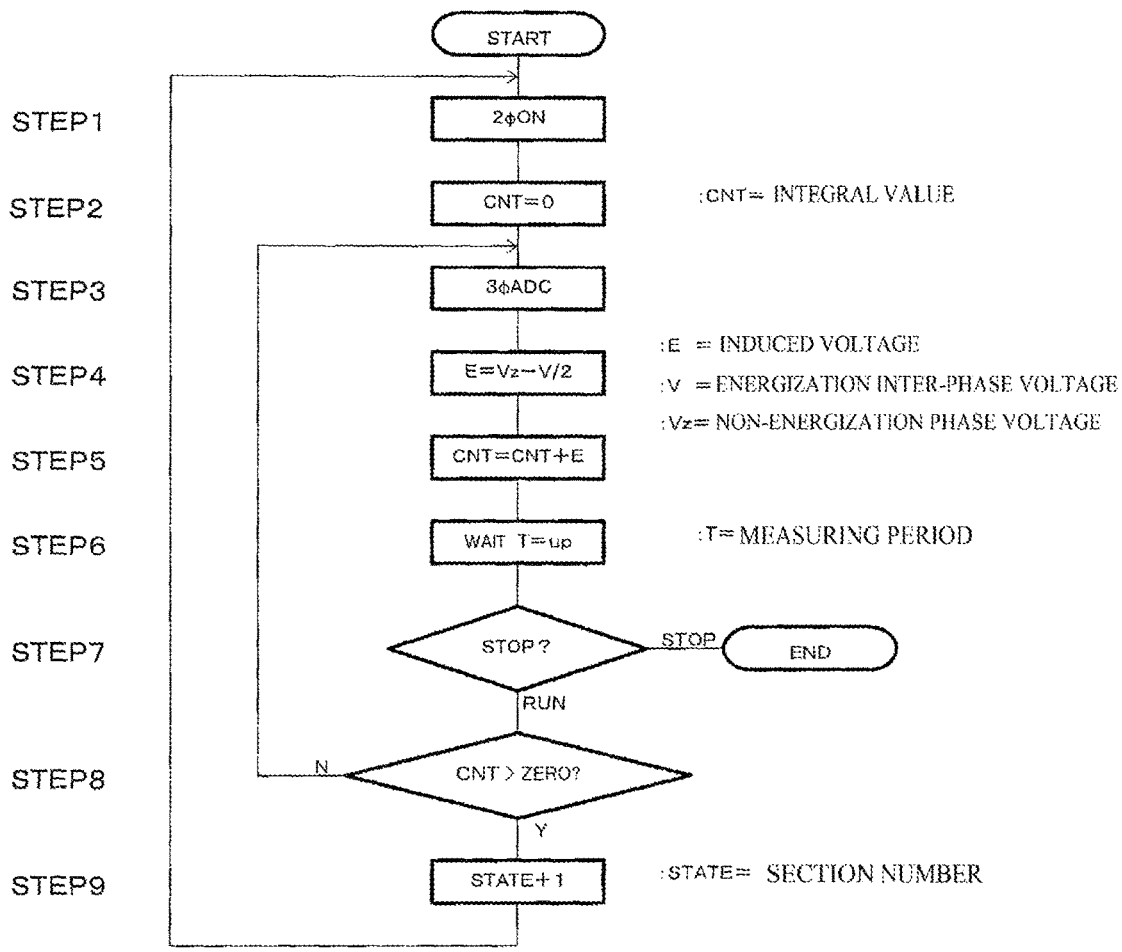
FIG. 9 is a flowchart showing an example of a driving method of a sensorless motor.

Next, an example of the motor driving control will be explained with reference to a flowchart of FIG. 9.

The superordinate controller 6 sends the rotation command RUN to the MCU 5 to start the motor, and the method relating to the present invention is applied when the rotation number of the rotor 2 reaches the rotation number enabling detecting induced voltages, thus basic actions will be explained.

The motor is started, and the excitation is started with the energization pattern corresponding to number of the present excitation section when the MCU 5 detects the excitation section starting position after the rotation number reaches the rotation number enabling detecting induced voltages (STEP 1). Upon starting the excitation, the integral value (CNT) is reset to zero (STEP 2).

The MCU 5 measures the coil voltages of the energization phases, by A/D-converting the coil voltages of the energization phases with the A/D converter 10, at a certain period T (STEP 3). The induced voltage value E is calculated by obtaining a difference between non-energization phase voltage Vz and ½ of energization inter-phase voltage V (i.e., "V/2" is neutral point potential) (STEP 4). The integration counter 11 adds the induced voltage value E to the integral value (CNT) (the integration: STEP 5). A step of extracting the induced voltage components from the coil voltages and integrating them is performed, by PWM interrupt control, at the certain period T (STEP 6). When the superordinate controller 6 inputs a stopping command, the MCU 5 stops the energization and terminates the routine (STEP 7). When no stopping command is inputted, determining if the integral value (CNT) of the integration counter 11 reaches zero or not is performed (STEP 8: waiting for ending of the excitation section). If the integral value (CNT) of the integration counter 11 does not exceed zero, the action is returned to STEP 3 so as to continue the integration. On the other hand, if the integral value (CNT) of the integration counter 11 exceeds zero, the excitation section is ended, and the excitation is advanced to the excitation section of the next number (STATE+1), and the action is returned to STEP 1 so as to start the excitation for the next excitation section (STEP 9).

The above described basic position detection and energization routine are simply performed by: measuring the induced voltages, by, for example, PWM interrupt control, at the certain period; integrating the measured voltages; and switching the excitation section to the next excitation section when the integral value exceeds zero. Therefore, calculation time can be shortened, and a speed control process of a main routine, etc. can be performed in good time.

Further, a practical program can be produced by adding the functions of the phase compensation for the excitation switching and the lead angle control. In the present embodiment, calculation loads relating to these additional functions are reduced. Further, by adding the functions of the initial position detection and the self-excitation positioning, the method of the present embodiment can be applied from starting the motor.

Note that, the structure of the motor circuits and the structure of the control programs may be variously varied, and they are not limited to the above described embodiment, so other principles for position detection, other circuit structures and other program structures, which are modified, by motor designers, electronic engineers and programmers (i.e., persons ordinarily skilled in the art) without deviating from the spirit of the present invention, are included in the scope of the present invention.

As described above, small-sized brushless DC motors are widely used in fields of in-vehicle devices, home electric appliances, industrial apparatuses and medical devices, the present invention is capable of making a contribution to widely extend use of the sensorless motors having superior properties, e.g., low cost, high environment resistance, high reliability, high resource saving, high energy saving, and its social significance is great.

What is claimed is:

1. A method for driving a sensorless motor, which is a three-phase DC brushless motor having no position sensor, said sensorless motor comprising:
   a motor driving circuit including a three-phase bridge circuit for energizing any two of three-phase coils which are star-connected through a common neutral point;
   a control circuit for controlling the motor driving circuit according to a rotation command sent from a superordinate controller; and
   a voltage measuring circuit for measuring voltage of the coils energized by the motor driving circuit,
   wherein the voltage measuring circuit includes: a voltage divider circuit for matching coil voltage of each of the phase coils energized by the motor driving circuit within a measurable input range if necessary; an A/D converter for measuring the coil voltage of each of the phase coils inputted through the voltage divider circuit; and an integration counter for integrating an induced voltage component included in the measured coil voltage of each of the phase coils,
   said method for driving the sensorless motor comprises continuously rotating the motor by repeating, by the control circuit, comprising:
   detecting an excitation section starting position, by the integration counter, while a rotor is rotated at a rotation number enabling detecting induced voltage or more; starting to energize the phase, which is energized by the motor driving circuit, with switching a energization pattern of the energized phase to that corresponding to a present excitation section when the integration counter detects the excitation section starting position; resetting the integration counter immediately after the motor driving circuit starts the energization; measuring coil voltage at a certain period by the A/D converter; extracting an induced voltage component from the coil voltage measured by the A/D converter and integrating the induced voltage component by the integration counter; and ending the excitation section when the integral value reaches or exceeds zero after the integration counter starts the integration, wherein the induced voltage component is extracted from a difference between a non-energization phase voltage or a common voltage and a neutral point potential, or from a difference between the non-energization phase voltage and the common voltage, and
   performing, by the control circuit, compensating a phase error caused by a leading angle and a delay angle, in which in case of a leading phase where "final induced voltage Va of a previous excitation section<first induced voltage Vb of the present excitation section" when switching an excitation section, theoretical cross-point voltage Vc of induced voltage is obtained by "Va+(Vb−Va)/2", and a resetting period, during which an integral value is reset until a measured value of induced voltage reaches Vc or less, is set; in case of a delay phase where "Va>Vb" when switching an excitation section, any one manner of a first manner, in which integration begins from first measurement of Vb, a second manner, in which a threshold value Vd is obtained by "−(Va+Vb)/2" without performing integration, and an excitation section is switched when a measured value of induced voltage reaches or exceeds Vd, and a third manner, in which the threshold value is set as "Vd=−Vb" without performing integration, and an excitation section is switched when a measured value of induced voltage reaches or exceeds Vd, is selected and performed, and wherein said phase compensation is repeated every time an excitation section is switched.

2. The method for driving a sensorless motor according to claim 1, wherein in case of a leading phase when switching an excitation section, the method further comprises obtaining, by the control circuit, neutral point potential offset voltage by "(Vb−Vc)/(a measured frequency of the resetting period)" and adding it to neutral point potential when ending the resetting period.

3. The method for driving a sensorless motor according to claim 1, wherein the method further comprises storing, by the control circuit, an integration peak value of induced voltage component of the previous excitation section, calculating an average of the previous integration peak value and a present integration peak value so as to obtain a section angular moving average when detecting the integration peak value of induced voltage component of the present excitation section, setting the obtained integral value as a threshold value for determining an end of excitation section, switching an excitation section on the basis of the threshold value, and repeating to obtain a section angular moving average of two sections and correcting the threshold value with advancing excitation sections.

4. The method for driving a sensorless motor according to claim 3, wherein the method further comprises performing, by the control circuit, lead angle control by delaying an integration starting position for a prescribed time or shifting an integration threshold value, which is a standard value for determining an end of an excitation section, by a prescribed value so as to forwardly shift a phase angle for switching excitation.

5. The method for driving a sensorless motor according to claim 1, wherein the method further comprises starting, by the control circuit, the motor by direct current energization, with performing PWM control with duty ratio of 100% or linear drive in at least a first excitation section, when the rotor is started and positioned near a starting angle of an excitation section, then measuring induced voltage and performing the integration.

6. The method for driving a sensorless motor according to claim 1, wherein the method further comprises measuring, by the control circuit, non-energization phase voltage for each measuring period and making a present measured value zero or not performing the integration of induced voltage component when a present measured value is equal to a previous measurement value.

7. The method for driving a sensorless motor according to claim 1, wherein the method further comprises previously setting, by the control circuit, a prescribed prohibition period for an optional excitation section, during which determination of an end of the section is prohibited or during which determination of a section end is prohibited in case that the section end is detected in an abnormally short time when switching an excitation section after starting the rotation of the rotor, setting a measurement prohibition period, which is about an electric time constant $\tau\Theta$, immediately after energization of an excitation section, then measuring non-energization phase voltage for each measuring period and integrating them, and performing the integration only, without determining an end of excitation section, until elapsing the prohibition period during which determination of a section end is prohibited.

8. The method for driving a sensorless motor according to claim 1, wherein the method further comprises detecting, by the control circuit, an initial position in case that an end of excitation section is not detected until elapsing a stop determination period, which has been previously set, after beginning energization of the excitation section, exciting a relevant excitation section in case that the rotor exists in any of the present excitation section, the previous excitation section and a next excitation section, and performing a first manner for restarting the motor or a second manner, in which self-excitation positioning is performed in a present excitation pattern, without detecting the initial position, so as to restart the motor, in case that the rotor exists in other excitation sections.

* * * * *